Oct. 20, 1970  B. BARÉNYI  3,534,628
SAFETY STEERING SYSTEM FOR MOTOR VEHICLES, ESPECIALLY
FOR PASSENGER MOTOR VEHICLES
Filed July 2, 1968  2 Sheets-Sheet 1

INVENTOR
BÉLA BARÉNYI

BY Craig & Antonelli
ATTORNEYS

INVENTOR
BÉLA BARÉNYI
BY Craig & Antonelli
ATTORNEYS

United States Patent Office 3,534,628
Patented Oct. 20, 1970

3,534,628
SAFETY STEERING SYSTEM FOR MOTOR VEHICLES, ESPECIALLY FOR PASSENGER MOTOR VEHICLES
Béla Barényi, Stuttgart-Vaihingen, Germany, assignor to Daimler-Benz Aktiengesellschaft, Stuttgart-Unterturkheim, Germany
Filed July 2, 1968, Ser. No. 742,069
Claims priority, application Germany, July 5, 1967, 1,630,313
Int. Cl. B62d 1/18
U.S. Cl. 74—492
18 Claims

ABSTRACT OF THE DISCLOSURE

A safety steering mechanism for motor vehicles, especially for passenger motor vehicles in which a steering column is arranged within a casing, whereby the latter is secured at the vehicle end wall by the interposition of a deformation member while the steering column consists of two parts adapted to telescope into one another in the axial direction; the two parts of the steering column are form-lockingly connected with each other in the radial direction to transmit the steering forces.

---

The present invention relates to a safety steering for motor vehicles, especially for passenger motor vehicles with a steering column arranged within a tubular casing.

In order to reduce the danger of injury to the driver in case of accidents, one aims at constructing the steering column so as to be movable in the longitudinal direction.

The aim of the present invention resides in producing, with the simplest structural expenditures and by means of uncomplicated parts, a steering arrangement, in which the steering column is able to yield in its longitudinal direction and in which an absolutely safe transmission of the steering forces is assured. The present invention essentially resides in that the tubular casing is secured at the end wall of the vehicle by the interposition of a deformation member and in that the steering column consists of two parts, telescoping one into the other in the axial direction, which are form-lockingly connected with each other in the radial direction. A conventional deformation pot, enlarged in a step-shaped manner toward the end wall, may be used to advantage as deformation member. In a structurally simple manner, the steering column may consist of a shaft and of a tubularly shaped part surrounding the same which are connected with each other by a splined connection, preferably at the lower end.

In order to prevent with certainty a canting or cornering of the two parts also with eccentric impacts, the shaft may be provided with two connecting places at which it is provided with enlargements and the tubularly shaped part with constrictions and/or insets. With this type of construction, the connection is completely disengaged already after a short displacement so that with a displacement swing to an eccentric load, no cornering can occur. Advantageously the connecting place disposed within the area of the deformation member can be constructed as entrainment coupling or clutch and the other connecting place, arranged in proximity to the steering wheel hub, exclusively as guide bearing.

According to a further feature and construction of the present invention, the steering gear and the deformation member may be arranged within the area of a cross bearer; the steering column preferably extends through this cross bearer. Common connecting means may keep or hold together the steering gear, the cross bearer, the end wall, and the deformation member of the casing.

The cross bearer may be reinforced at the place, where the steering column extends through the same, by a pot-shaped reinforcing insert, against whose bottom made from a sheet metal plate, abuts the securing flange of the steering gear.

Accordingly, it is an object of the present invention to provide a safety steering system for motor vehicles, especially for passenger motor vehicles which avoids the aforementioned shortcomings and drawbacks encountered in the prior art.

Another object of the present invention resides in a safety steering system for motor vehicles which provides a steering column, yieldable in its longitudinal direction, with minimum structural expenditures.

A further object of the present invention resides in a safety steering device of the type described above which not only assures an absolutely safe transmission of the steering forces but additionally utilizes relatively uncomplicated parts that can be manufactured and assembled in a simple manner.

Still a further object of the present invention resides in a safety steering system for passenger motor vehicles in which the danger of improper operation due to eccentric impacts is prevented with certainty.

These and further objects, features, and advantages of the present invention will become more obvious from the following description when taken in connection with the accompanying drawing, which shows, for purposes of illustration only, two embodiments in accordance with the present invention, and wherein.

Figure 1:
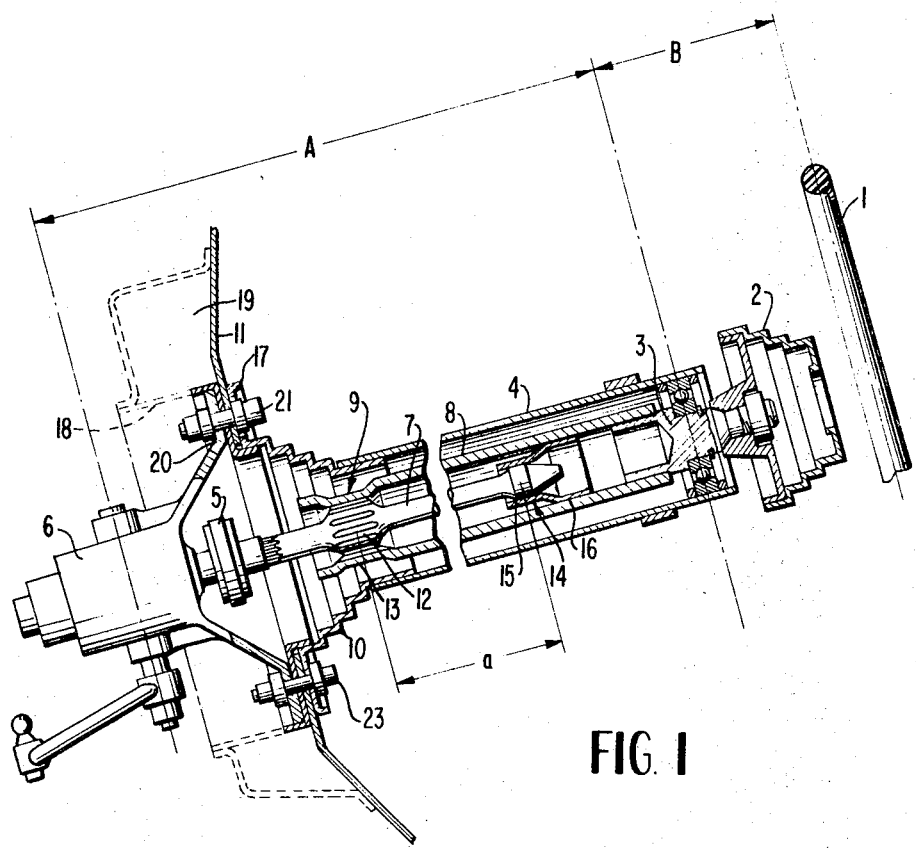
FIG. 1 is a longitudinal cross-sectional view through a first embodiment of a safety steering device in accordance with the present invention.
Figure 2:
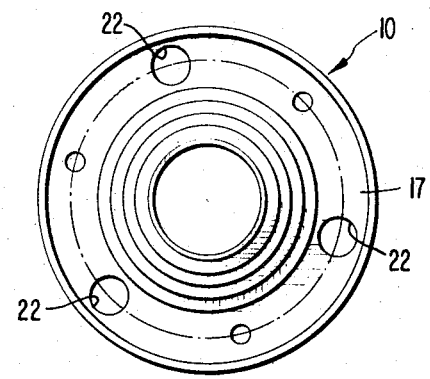
FIG. 2 is a plan view on the deformation member of the safety steering device of FIG. 1.

Referring now to the drawing wherein like reference numerals are used throughout the various views to designate like parts, and more particularly to FIG. 1, reference numeral 1 designates therein the steering wheel which is connected in a conventional manner by way of a deformation pot 2 with the steering wheel hub 3. The two-partite steering column, which is supported within the tubular casing 4, adjoins the steering wheel hub 3 and is operatively connected with the steering gear 6 by way of a coupling 5 of any conventional construction.

The two-partite steering column consists of a shaft 7 and of a tubular part 8 surrounding the shaft 7 with a spacing. No connection is provided in the axial direction between the two parts 7 and 8 of the steering column whereas a circumferential form-locking connection exists in the form of a splined tooth connection between the shaft 7 and the tubular shaped part 8 at the connecting place generally designated by reference numeral 9. The shaft 7 has an enlargement 12 at the connecting place 9 in proximity to the deformation pot 10, by means of which the casing 10 is secured at the end wall 11 of the vehicle, whereas the tubular shaped part 8 is provided thereat with a constriction 13. A further connecting place generally designated by reference numeral 14, located in proximity to the steering wheel hub 3, is provided at the largest possible distance $a$ to this connecting place 9. Also, at this connecting place 14, the shaft 7 has an enlargement 15 whereas an insert 16 is secured within the tubularly shaped part 8 which is matched to the diameter of the enlargement 15. It suffices for the safe transmission of the steering forces from the steering wheel 1 to the steering gear 6 if only one of the two connecting places 9 or 16 includes a form-locking connection.

The deformation pot 10 which is inserted into the lower end of the tubular casing 4 and which is enlarged in a step-shaped manner toward the end wall 11, abuts with an annular flange 17 against the end wall 11. The cross bearer 19, which is provided within this area with a pot-shaped reinforcing insert 18, offers the possibility that the flange 20 of the steering gear 6 is secured only by the interposition of the sheet metal bottom plate of the pot-shaped insert 18 of the cross bearer 19 and of the sheet metal end wall 11 which may possibly be additionally reinforced. Provision may be made thereby that the flange 20 of the steering gear 6 is secured at the end wall 11 by separate bolts 21, whence the annular flange 17 of the deformation pot 10 receives corresponding bores 22 at these places. The fastening of the deformation pot 10 takes place in such a manner that the bolts 23, in addition to providing a threaded connection for the deformation pot and/or the end wall 11, also provide a threaded connection for the flange 20 of the steering gear 6. The displaceability of the safety steering mechanism is subdivided into two areas A and B to which one deformation pot 2 and 10 each is coordinated.

Figure 3:
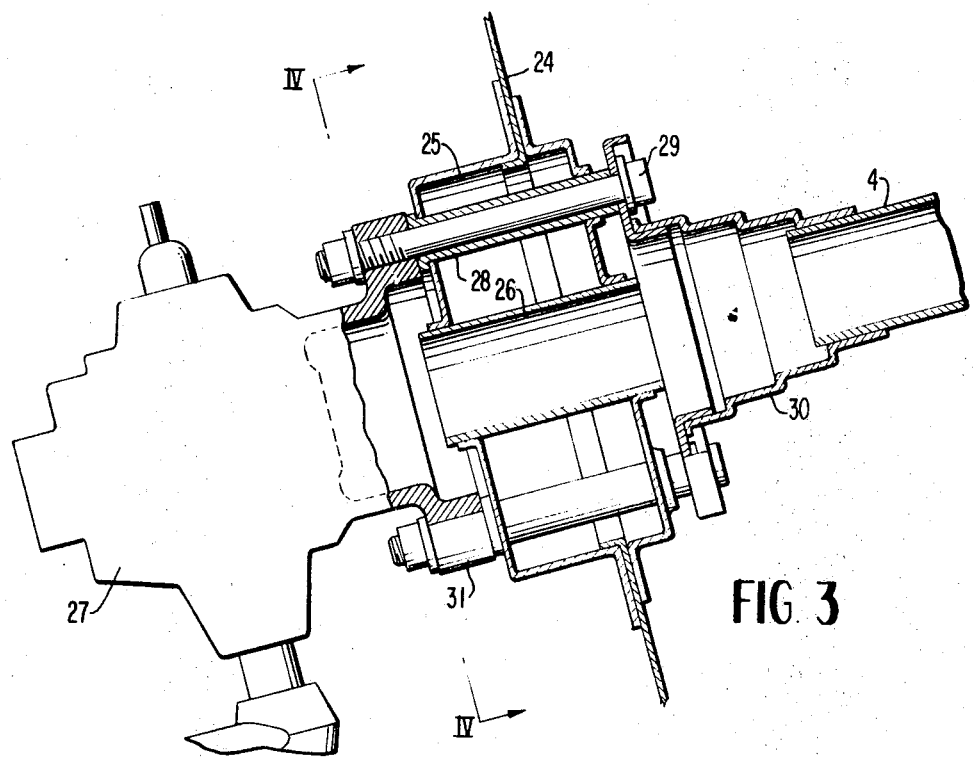
FIG. 3 is a partial longitudinal cross-sectional view through a modified embodiment of a safety steering device in accordance with the present invention, illustrating a possibility of securing the safety steering at a cross bearer.
Figure 4:
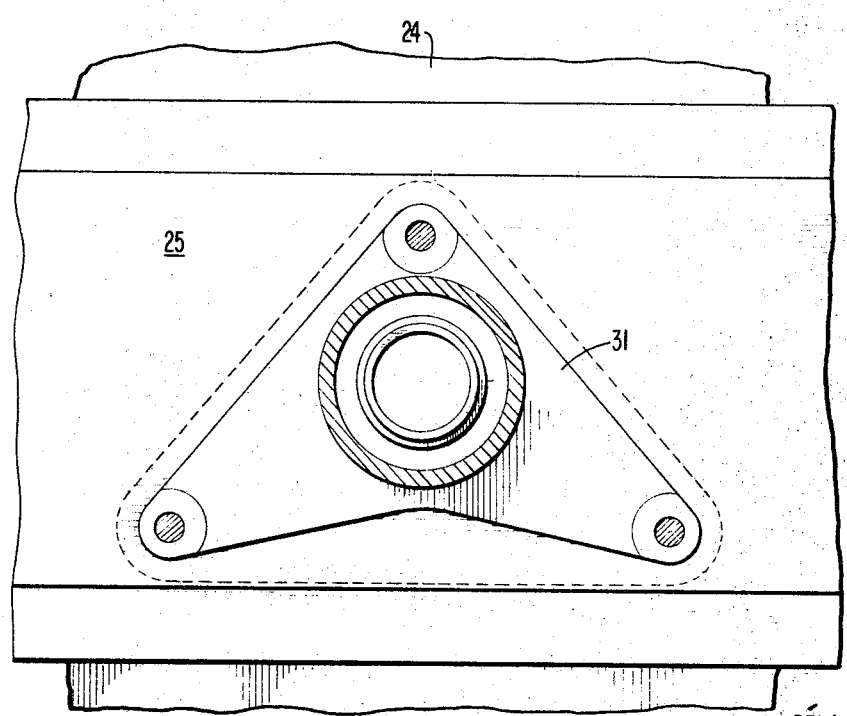
FIG. 4 is a cross-sectional view, taken along line IV—IV of FIG. 3.

In the embodiment according to FIG. 3, the cross bearer 25 disposed in the end wall 24 of the vehicle is provided only with a passage 26 formed by a tubular piece for extending therethrough the steering column to the coupling of the steering gear 27 as well as with spacer pipes 28 for the accommodation of the connecting means consisting of bolts 29. The annular flange of the deformation pot 30 and the flange 31 of the steering gear 27 are thus threadably secured at spacer pipes 28 welded into the cross bearer 25 by means of common bolts 29. The flange 31 of the steering gear 27 may have an essentially triangularly shaped configuration (FIG. 4).

While I have shown and described only two embodiments in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. A safety steering device for motor vehicles, especially for passenger motor vehicles, having a steering column arranged within a casing, wherein the improvement comprises means for securing said casing at an end wall of the vehicle by the interposition of deformation means, the steering column including two parts adapted to telescope into one another in the axial direction, and form-locking connecting means for form-lockingly connecting said two parts in the circumferential direction, wherein said deformation means includes a deformation pot enlarged step-shaped in the direction toward the end wall and the steering column includes a unitary shaft having an upper and lower connecting place and a tubular shaped part surrounding said shaft, said lower connecting place being located in the area of said deformation means and being provided with said form-locking connecting means constituted by a spline-tooth connection, and said upper connecting place being received in an insert within said tubular shaped part.

2. A safety steering device according to claim 1, wherein said shaft, at said upper and lower connecting places, is effectively provided with enlargements, and wherein the tubular shaped part is effectively provided at said places with constrictions.

3. A safety steering device according to claim 2, wherein said constriction of the tubular shaped part provided at said upper connecting place is constituted by said insert within said tubular shaped part.

4. A safety steering device according to claim 2, wherein the upper connecting place, arranged within proximity of a steering wheel hub, is constructed exclusively as guide bearing means.

5. A safety steering device according to claim 4, further comprising steering gear means and cross bearer means, said steering gear means and said deformation means being arranged within the area of and operatively associated with said cross bearer means.

6. A safety steering device according to claim 5, wherein the steering column extends through said cross bearer means.

7. A safety steering device according to claim 6, said means for securing said casing at said end wall comprising common connecting means for holding together the steering gear means, the cross bearer means, the end wall, and the deformation means of the casing.

8. A safety steering device according to claim 7, wherein said cross bearer means is reinforced at the place where the steering column extends through the same by a pot-shaped insert means, the steering gear means resting against means having a securing flange bottom on said pot-shaped insert means.

9. A safety steering device according to claim 8, wherein said bottom is constituted from sheet metal.

10. A safety steering device for motor vehicles, especially for passenger motor vehicles, having a steering column arranged within a casing, wherein the improvement comprises means for securing said casing at an end wall of the vehicle by the interposition of deformation means, the steering column including two parts adapted to telescope into one another in the axial direction, and form-locking connecting means for form-lockingly connecting said two parts in the circumferential direction, wherein the steering column includes a unitary shaft having an upper and lower connecting place and a tubular shaped part surrounding said shaft, said lower connecting place being located in the area of said deformation means and being provided with said form-locking connecting means constituted by a spline-tooth connection, and said upper connecting place being received in an insert within said tubular shaped part.

11. A safety steering device according to claim 10, wherein said form-locking connecting means is provided at the lower end of the steering column.

12. A safety steering device according to claim 10, wherein said shaft, at said upper and lower connecting places, is effectively provided with enlargements, and wherein the tubular shaped part is effectively provided at said places with constrictions.

13. A safety steering device according to claim 12, wherein said constriction of the tubular shaped part provided at said upper connecting place is constructed by said insert within said tubular shaped part.

14. A safety steering device according to claim 12, wherein the upper connecting place, arranged within proximity of a steering wheel hub, is constructed exclusively as guide bearing means.

15. A safety steering device according to claim 14, further comprising steering gear means and cross bearer means, said steering gear means and said deformation means being arranged within the area of and operatively associated with said cross bearer means.

16. A safety steering device according to claim 15, wherein the steering column extends through said cross bearer means.

17. A safety steering device according to claim 16, wherein said cross bearer means is reinforced at the place where the steering column extends through the same by a pot-shaped insert means, the steering gear means resting against means having a securing flange bottom on said pot-shaped insert means.

18. A safety steering device according to claim 15, said means for securing said casing at said end wall comprising common connecting means for holding together the steering gear means, the cross bearer means, the end wall, and the deformation means of the casing.

References Cited

UNITED STATES PATENTS 3,167,974 2/1965 Wilfert _____ 74—552
3,394,612 7/1968 Bogosoff et al. _____ 74—492
3,415,140 12/1968 Bien et al. _____ 74—492

MILTON KAUFMAN, Primary Examiner

U.S. Cl. X.R.

180—78; 280—87